United States Patent
Sung et al.

(10) Patent No.: US 11,742,923 B1
(45) Date of Patent: Aug. 29, 2023

(54) VARIABLE PORT MAPPING CONFIGURATIONS FOR BEAMFORMING IN ANTENNA ARRAYS

(71) Applicant: T-Mobile Innovations LLC, Overland Park, KS (US)

(72) Inventors: Sanghoon Sung, Ashburn, VA (US); Udit Anilbhai Thakore, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 79 days.

(21) Appl. No.: 17/469,697

(22) Filed: Sep. 8, 2021

(51) Int. Cl.
*H04B 7/06* (2006.01)
*H04B 7/08* (2006.01)

(52) U.S. Cl.
CPC ......... *H04B 7/0693* (2013.01); *H04B 7/0608* (2013.01); *H04B 7/0802* (2013.01); *H04B 7/0857* (2013.01)

(58) Field of Classification Search
CPC .. H04B 7/0693; H04B 7/0608; H04B 7/0802; H04B 7/0857
See application file for complete search history.

(56) References Cited

U.S. PATENT DOCUMENTS

| | | | | |
|---|---|---|---|---|
| 2015/0280801 A1* | 10/2015 | Xin | ........................ | H04L 5/0048 370/329 |
| 2016/0080052 A1* | 3/2016 | Li | ........................ | H04B 7/0456 375/267 |
| 2017/0195100 A1* | 7/2017 | Kim | ....................... | H04B 7/0456 |
| 2022/0007224 A1* | 1/2022 | Venugopal | ............ | H04W 24/10 |
| 2022/0078780 A1* | 3/2022 | Choi | .................... | H04B 7/0456 |
| 2022/0271802 A1* | 8/2022 | Lee | ...................... | H04B 7/0413 |

* cited by examiner

*Primary Examiner* — Nader Bolourchi
(74) *Attorney, Agent, or Firm* — Shook, Hardy & Bacon L.L.P.

(57) ABSTRACT

Systems, methods, and computer-readable media herein modify the configuration of one or more antenna elements of an antenna array based on signal quality information associated with one or more UE devices. The signal quality information of the UE devices can be analyzed by a base station and the base station can respond to the change in signal quality of the UE devices by modifying one or more antenna elements from a first mapping to a second mapping to improve the quality of transmissions between the UE devices and a base station.

20 Claims, 12 Drawing Sheets

VARIABLE PORT MAPPING CONFIGURATIONS FOR BEAMFORMING IN ANTENNA ARRAYS

SUMMARY

The present disclosure is directed, in part, to variable port mapping configurations for beamforming in antenna arrays based on signal quality data, substantially as shown in and/or described in connection with at least one of the figures, and as set forth more completely in the claims.

In aspects set forth herein, one or more antenna elements of an antenna array may be identified and modified from one mapping of the antenna elements to another mapping of the antenna elements, based at least partly on information associated with one or more devices, including signal quality information for the one or more devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
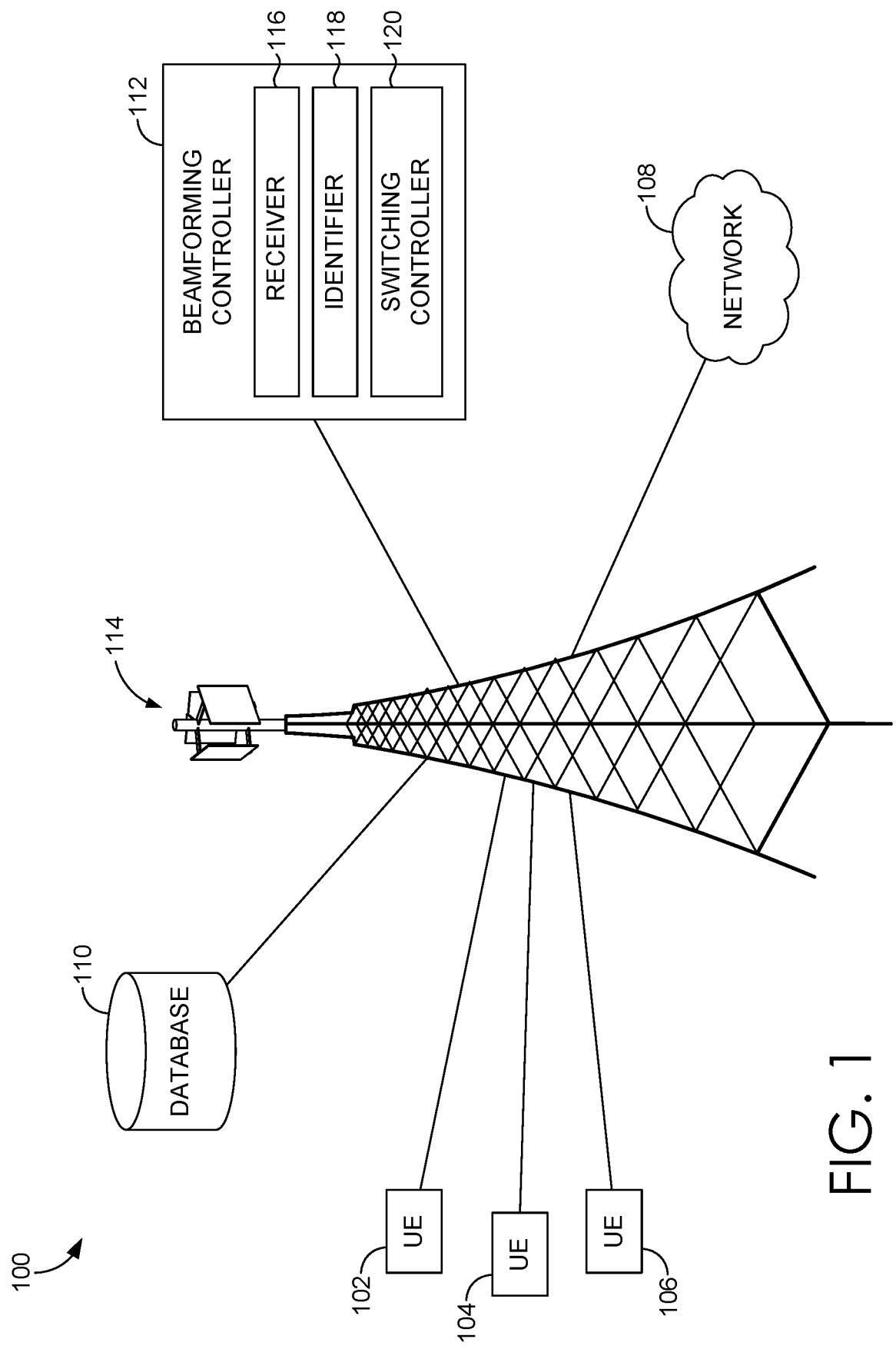
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:
AWS Advanced Wireless Services
BRS Broadband Radio Service
BTS Base Transceiver Station
CDMA Code Division Multiple Access
CSI-RS Channel State Information Reference Signal
EBS Educational Broadband Services
eNodeB Evolved Node B
EVDO Evolution-Data Optimized
gNodeB Next Generation Node B
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, conventional telecommunications networks may employ base stations (e.g., cell sites, cell towers) to provide network coverage. These base stations may be utilized to broadcast and transmit transmissions to user devices of the telecommunications network. Conventionally, antenna arrays located at a base station, transmit or receive signals according to a protocol. Antenna arrays are used to simultaneously transmit or receive signals with any of a number of user equipment devices which may be located at a variety of locations. For this and other reasons, certain telecommunications networks have deployed antenna arrays, where the antenna elements can be configured for beamforming, allowing the base station to aim or steer a transmitted signal, or beam, to a particular device using the additive and subtractive qualities of transmitted waveforms. A beam refers to a radiation pattern of an antenna system and indicates the direction and field strength of radio frequency waves. For example, an antenna system may emit a beam, expressed as one or more lobes, that indicates the direction and power of transmitted data. A particular configuration of antenna elements and a corresponding transmitted signal can provide a higher data rate and bandwidth with a specific user equipment ("UE") device. However, such a fixed configuration may present issues with UE devices such as mobile phones, vehicles, or any of a number of devices which may move from one location to another location. A beamforming configuration that is effective for a device at a first location may be insufficient, inefficient, or otherwise ill-suited to provide adequate signal strength to the same device as it moves to a second location. Additionally, an improperly configured beamforming scheme may cause interference in the UE devices that are transmitting with the base station and may decrease the probability that transmitted information is received intact.

At a high level, systems, methods, and computer-readable media of the present invention modify the configuration of one or more antenna elements of an antenna array based on signal quality information associated with one or more UE devices. The systems, methods, and computer-readable media disclosed herein may provide an improved efficiency, quality, power consumption, and/or bandwidth in signals that are transmitted and received by a base station. By basing the configuration of one or more antenna elements on signals that provide an indication of signal quality at the UE devices, the base station can respond to a change in location of the UE devices or any condition (e.g. atmospheric condition, signal occlusion) that causes a degradation in signal quality for the UE devices. Adapting the configuration of one or more antenna elements enables a higher quality signal to be transmitted between a base station and a device and thus improving data speed, efficiency, transmitting power, packet transmission, and any or a number aspects relating to the performance of a telecommunication network.

In a first aspect of the present invention, a method is provided. The method comprises receiving information associated with one or more devices. The information may comprise signal quality information for each of the one or more devices. The method further comprises constructing, based on one or more antenna elements being configured in a first mapping, a second mapping of the one or more antenna elements by using the information associated with the one or more devices. The method further comprises, modifying a configuration of the one or more antenna elements from the first mapping to the second mapping.

In a second aspect of the present invention, computer-readable media is provided, the computer-readable media having computer-executable instructions embodied thereon that, when executed, perform a method. In accordance with the media, information associated with one or more devices is received. In some embodiments, the information associated with the one or more devices may comprise signal quality information. The method further comprises, that based on one or more antenna elements being configured in a first mapping, constructing a second mapping of the antenna elements. In some embodiments, constructing the second mapping of the antenna elements uses the information associated with the one or more devices. The method further comprises modifying a configuration of the one or more antenna elements from the first mapping to the second mapping.

In a third aspect of the present invention, a system is provided. The system comprises an antenna array comprising a plurality of antenna elements. In some embodiments, the plurality of antenna elements utilize a first mapping of the antenna elements at a first time. The system also comprises a processor configured to execute operations comprising receiving signal quality information associated with one or more devices. The system also comprises, identifying one or more antenna elements of an antenna array for modification between the first mapping of the one or more antenna elements and a second mapping. In some embodiments, identifying the antenna elements of an antenna array for modification is performed based on the information associated with the one or more devices. The system further comprises, modifying, at a second time, the one or more antenna elements from the first mapping to the second mapping.

As used herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 800 described herein with respect to FIG. 8.

Turning now to FIG. 1, network environment 100 is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

The network environment 100 of FIG. 1 includes user devices 102, 104, and 106, a cell site 114, a network 108, a database 110, and a beamforming controller 112. In the network environment 100, the user devices 102, 104, and 106 may take on a variety of form, such as a PC, a user device, a smart phone, a smart watch, a laptop computer, a mobile phone, a mobile device, a tablet computer, a wearable computer, a PDA, a server, a CD player, an MP3 player, GPS device, a video player, a handheld communications device, a workstation, a router, an access point, and any combination of these delineated devices, or any other device that communicates via wireless communications with a cell site 114 in order to interact with network 108, which may be a public or a private network.

In some aspects, the user devices 102, 104, and 106 corresponds to a user device or a computing device. For example, the user device may include a display(s), a power source(s) (e.g., a battery), a data store(s), a speaker(s), memory, a buffer(s), a radio(s), and the like. In some implementations, the user devices 102, 104, and 106 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the user devices 102, 104, and 106 in network environment 100 may optionally utilize network 108 to communicate with other computing devices (e.g., a mobile device(s), a server(s), a personal computer(s), etc.) through cell site 114. The network 108 may be a telecommunications network(s), or a portion thereof. A telecommunications network might include an array of devices or components (e.g., one or more base stations), some of which are not shown. Those devices or components may form network environments similar to what is shown in FIG. 1 and may also perform methods in accordance with the present disclosure. Components such as terminals, links, and nodes (as well as other components) may provide connectivity in various implementations. Network 108 may include multiple networks, as well as being a network of networks, but is shown in more simple form so as to not obscure other aspects of the present disclosure.

Network 108 may be part of a telecommunication network that connects subscribers to their service provider. In aspects, the service provider may be a telecommunications service provider, an internet service provider, or any other similar service provider that provides at least one of voice telecommunications and/or data services to user devices 102, 104, and 106 and any other UEs. For example, network 108 may be associated with a telecommunications provider that provides services (e.g., LTE) to the user devices 102, 104, and 106. Additionally or alternatively, network 108 may provide voice, SMS, and/or data services to user devices or corresponding users that are registered or subscribed to utilize the services provided by a telecommunications provider. Network 108 may comprise any communication network providing voice, SMS, and/or data service(s), using any one or more wireless communication protocols, such as a 1× circuit voice, a 3G network (e.g., CDMA, CDMA2000, WCDMA, GSM, UMTS), a 4G network (WiMAX, LTE, HSDPA), or a 5G network. The network 108 may also be, in whole or in part, or have characteristics of, a self-optimizing network.

In some implementations, cell site 114 is configured to communicate with the user devices 102, 104, and 106 that are located within the geographical area defined by a transmission range and/or receiving range of the radio antennas of cell site 114. The geographical area may be referred to as the "coverage area" of the cell site or simply the "cell," as used interchangeably hereinafter. Cell site 114 may include one or more base stations, base transmitter stations, radios, antennas, antenna arrays, power amplifiers, transmitters/receivers, digital signal processors, control electronics, GPS equipment, and the like. In particular, cell site 114 may be configured to wirelessly communicate with devices within a defined and limited geographical area. For the purposes of the present disclosure, it may be assumed that it is undesirable and unintended by the network 108 that the cell site 114 provide wireless connectivity to the user devices 102, 104, and 106 when the user devices 102, 104, and 106 are geographically situated outside of the cell associated with the cell site 114.

In an exemplary aspect, the cell site 114 comprises a base station that serves at least one sector of the cell associated with the cell site 114 and at least one transmit antenna for propagating a signal from the base station to one or more of the user devices 102, 104, and 106. In other aspects, the cell site 114 may comprise multiple base stations and/or multiple transmit antennas for each of the one or more base stations, any one or more of which may serve at least a portion of the cell. In some aspects, the cell site 114 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

As shown, cell site 114 is in communication with the beamforming controller 112, which comprises various components that are utilized, in various implementations, to perform one or more methods for variable port mapping configurations for beamforming in an antenna array, such as an antenna array on the cell site 114. In aspects, the beamforming controller 112 may comprise a receiver 116, an identifier 118, and a switching controller 120. However, in some embodiments, other components than those shown in FIG. 1 may be utilized to carry out aspects of the systems and methods described herein. Each of the components or sub components of the beamforming controller 112 may be a stand-alone or combined processor, server, or other computer processing component that is suitably configured to perform the operations described herein.

In various aspects, the receiver 116 of the beamforming controller 112 is generally responsible for receiving information associated with one or more user devices, e.g., the user devices 202, 204, and/or 206. In aspects, the receiver 116 may receive a message or transmission comprising the information associated with one or more user devices may be information that is relevant for beamforming and configuring one or more elements of an antenna array for communication with one or more devices. For instance, in certain aspects, the information associated with one or more user devices may be associated with a reference signal used to control and manage downlink channels. For example, reference signals may be transmitted by a base station and used for beamforming and to estimate downlink channels and modulate associated physical channels. As another example, references signals may be used to estimate communication signal power, tracking transmitter phase, channel sounding, or any of a number of communication operations. In some aspects, a reference signal may comprise DMRS, PT-RS, CSI-RS, SRS, or a combination thereof. In certain aspects, the information associated with one or more user devices can include signal quality information associated with one or more user devices. Signal quality information may comprise any value, measure, or indication of signal attributes (e.g., power, noise, quality, signal strength). Signal quality information may comprise measurements such as SINR, RSRP, RSRQ, RSSI, or a combination thereof.

In aspects, the identifier 118 utilizes and/or analyzes the information received from the receiver 116 to identify which antenna elements of an antenna array should be switched from a configuration associated with a first mapping to a configuration associated with a second mapping. In aspects, the identifier 118 can analyze signal quality information associated with one or more devices, to identify antenna elements for modification to a different mapping than the mapping currently being utilized for the respective antenna elements. For instance, in aspects, the identifier 118 can analyze the information associated with the one or more user devices to facilitate effective use of the antenna elements of an antenna array by the user devices. Specific use examples of the beamforming controller 112 and/or the identifier 118 utilizing the information associated with the one or more user devices to identify antenna elements for modification to a mapping are discussed below with reference to FIG. 3.

In aspects, once the identifier 118 has identified one or more antenna elements of the antenna array for modification from a first mapping to a second mapping, the switching controller 120 facilitates the modifying of the configuration for the identified antenna elements. In one example aspect, the switching controller 120 can control or instruct a power amplifier associated with an antenna array, or one or more antenna elements, to adjust a power level supplied to the one or more antenna elements to effectuate or initiate modifying the configuration of the antenna elements. For instance, in one aspect, the switching controller 120 may instruct or control an antenna element in order to transmit data, e.g., data requested by a user device, using a configuration associated with a new mapping of the antenna elements instead of a configuration associated with a previous mapping of the antenna elements. In some aspects, the switching controller 120 can determine a beam having a beam weighting. The beam weighting may be based on a wideband beam amplitude scaling factor, a subband beam amplitude scaling factor, a beam phasing combining coefficient, or a combination thereof.

Figure 2:
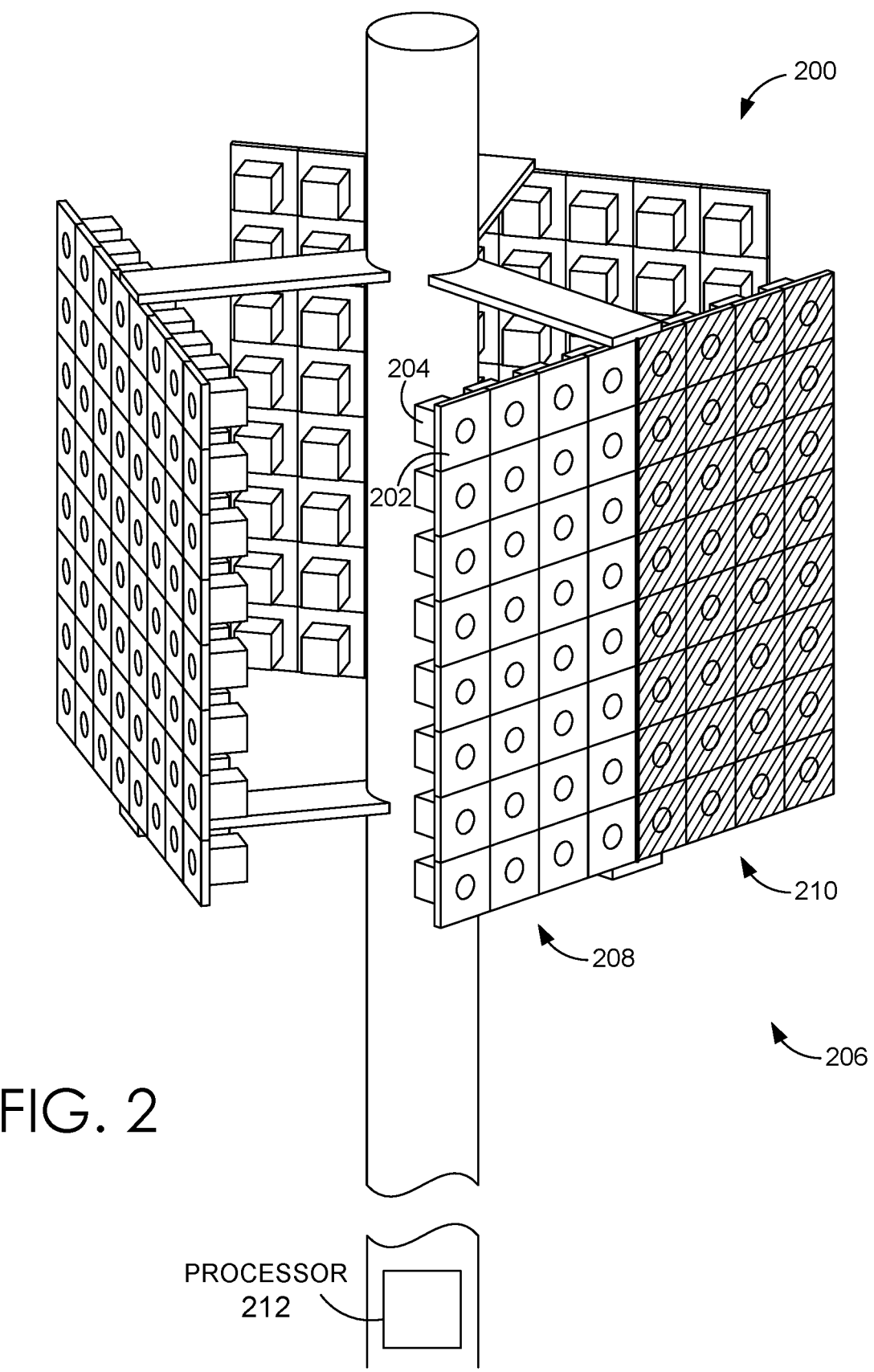
FIG. 2 depicts a schematic representation of a base station suitable for use in aspects of the present disclosure.

FIG. 2 depicts an example base station configuration suitable for use in implementing embodiments of the present disclosure and is designated generally as base station 200. Base station 200 is but one example of a suitable configuration and is not intended to suggest any limitations as to the scope of use or functionality of embodiments described herein. Neither should the configuration be interpreted as having any dependency or requirement relating to any one or combination of components illustrated.

Base station 200 comprises at least a first antenna array 206, the first antenna array 206 having one or more antenna elements 202. In aspects, the one or more antennas 202 may be dipole antennas, having a length, for example, of ¼, ½, 1, 1½, or any desired wavelength. In aspects, the antenna array 206 may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz-30 GHz.

By way of a non-limiting example, the antenna array 206 may comprise 64 antenna elements 202 arranged in an 8×8 structure or grid, having 8 rows of 8 columns of the 64 antenna elements 202. In other aspects, the antenna array 206 may comprise antenna elements arranged in an 8×4, 4×8, or 4×4 configuration. Although, the arrangement of the antenna elements 202 is discussed as a grid structure herein, the arrangement of the antenna elements 202 may have any of a number of structures, multi-planar positions, and vertical and/or horizontal arrangements. Each antenna element 202 of the antenna array 206 may comprise a dedicated power supply 204. The power supply 204 supplies power having a certain phase and amplitude to a respective antenna element 202. In an aspect, the power supply comprises a power amplifier. In various aspects, the power supply, e.g., the power supply 204, may additionally comprise a processor for controlling or adjusting the power supply to the respective antenna element 202, e.g., as discussed above with reference to the beamforming controller 112 of FIG. 1. In aspects, each power supply 204 may have a maximum power to supply to its respective antenna element 202. In aspects, the maximum per-antenna supply power may be 2.5 W, 3.5 W, 4 W, 5 W, or any desired value.

In aspects, the antenna array 206 may comprise a partitioning of the antenna array 206 into a first sub-array 208 and a second sub-array 210. As depicted in FIG. 2, the first sub-array 208 can include 4 contiguous columns of eight antenna elements each, on the left side of the antenna array 206, and the second sub-array 210 can include 4 contiguous columns of eight antenna elements each, on the right side of the antenna array 206. In some aspects, the antenna elements of the antenna array 206 may be associated with a mapping. A mapping of the antenna elements of the antenna array 206 may comprise arranging or grouping one or more antenna elements together to form a sub-array, such as the first sub-array 208 and the second sub-array 210. In aspects, mapping antenna elements, such as to create a sub-array, may be performed by associating the desired antenna elements with a logical port of the base station 200. For example, the antenna elements of the first sub-array 208 be mapped to a first logical port and the antenna elements of the second sub-array 210 may be mapped to a second logical port. A logical port, or antenna port, may be used to transmit downlink signals from the base station 200. A base station 200 may have one or more logical ports that may be mapped to one or more antenna elements of the antenna array 206 and may be used to transmit many signals in parallel. In some aspects, a particular mapping of the one or more logical port may be configured to provide a desired signal transmission by influencing the power and/or direction of transmitted signals. For example, mapping a single antenna element to a logical port may have lower transmit power than if an array of multiple antenna elements were mapped to the logical port, thus reserving communication resources of the base station 200 for other potential transmissions or uses. One or more sub-arrays, such as the first sub-array 208 and the second sub-array 210, may each be mapped to a one or more logical ports. As an example, the first sub-array 208 of the antenna array 206 may be mapped to 2 logical ports—one for each antenna polarization—and the second sub-array 210 may be mapped to 2 additional logical ports, mapping the antenna array to a total of 4 logical ports. As another example, the antenna array 206 partitioned into 4, 8, and 16 sub-arrays may have 8, 16, and 32 logical ports associated with the sub-arrays respectively.

It should be understood that the configuration or pattern of the antenna elements 202 utilizing a mapping of the first sub-array 208 and second sub-array 210 to corresponding logical ports is just one example configuration. In aspects, this left half and right half configuration depicted in FIG. 2 may be a default configuration for the antenna array 206, where the beamforming controller 112 of FIG. 1 is utilized to analyze, switch, and/or modify all or any part of the antenna elements 202 between a first mapping and a second mapping which may involve configuring antenna elements into sub-arrays that may be partitioned on vertical and/or horizontal arrangements. FIGS. 4A-4E provide some other example configurations and are discussed in detail below.

In aspects, the base station 200 may further comprise a processor 212. In such aspects, the processor 212 may be any one or more convenient processors, servers, computer processing components, or the like, that can be configured to perform any one or more operations of the beamforming controller 112 of FIG. 1. In some aspects, the processor 212 may be communicatively coupled to the first portion 208 and the second portion 210, and/or to each antenna element 202 of the first portion 208 and the second portion 210. In aspects, as discussed above with respect to the beamforming controller 112 of FIG. 1, the processor 212 of FIG. 2 may execute all or a part of the actions for port mapping configurations for beamforming in antenna arrays based on information associated with one or more devices.

Figure 3:
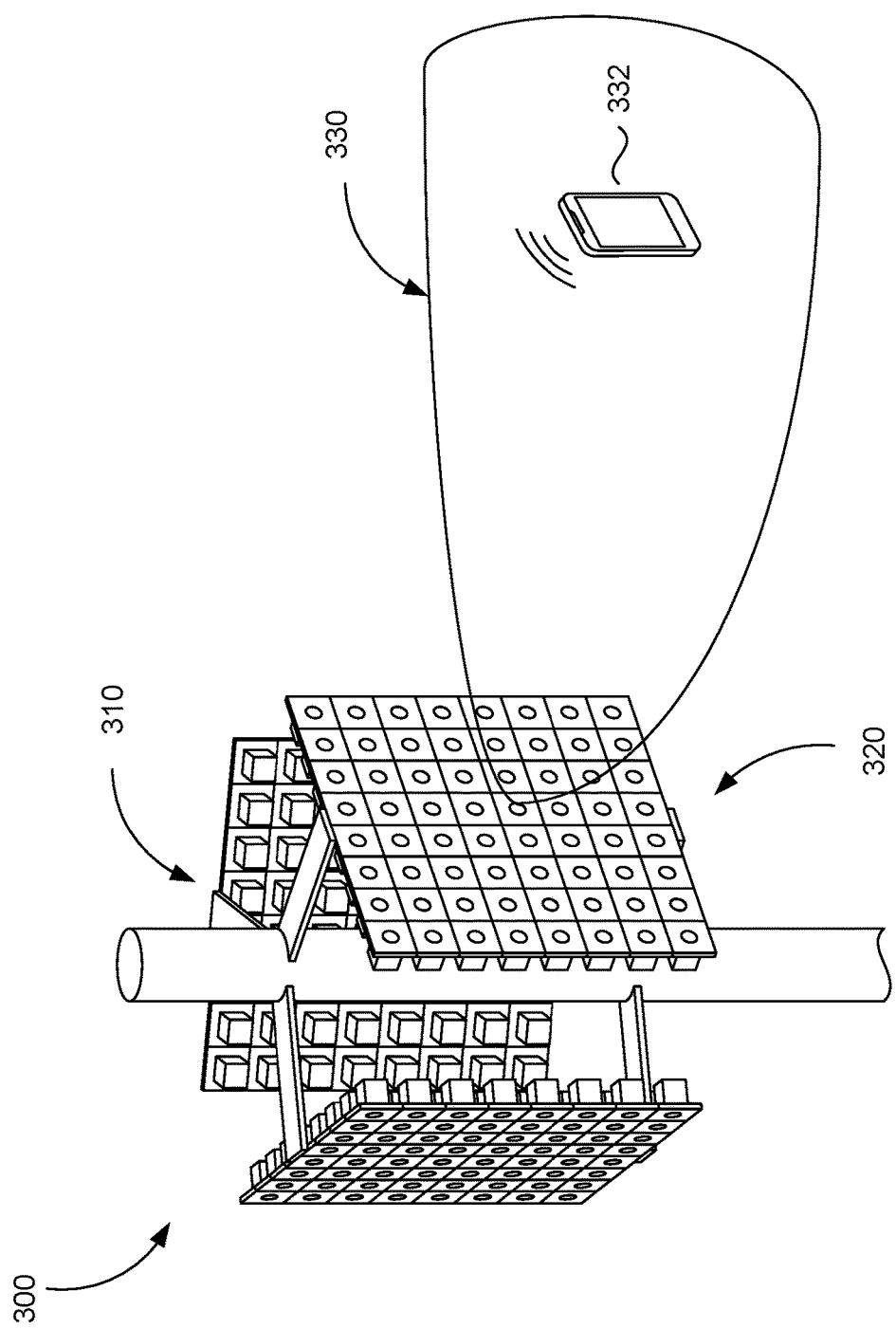
FIG. 3 depicts a system that includes a base station and a plurality of user devices in varying locations within one or more beams of an antenna array, in accordance with aspects herein.

FIG. 3 depicts a system 300, e.g., a telecommunications system, which includes a base station 310 for providing wireless communication services to a plurality of user devices. In the aspect depicted in FIG. 3, the base station 310 includes an antenna array 320. In aspects, the base station 310 can include any or all of the properties and parameters of the base station 200 described above with reference to FIG. 2 and/or the network environment 100, including the cell site 114, described above with reference to FIG. 1. For instance, in aspects, the base station 310 can include a first portion of a plurality of antenna elements that may be mapped to a first set of logical ports and one or more additional portions of the plurality of antenna elements that may be mapped to one or more additional logical ports of the base station 310. In the aspect depicted in FIG. 3, the base station 310 and/or antenna array 320 is communicating with a UE 332.

In aspects, as discussed above, the systems and methods disclosed herein may receive information associated with one or more UEs to identify antenna elements for modification between one mapping and a second mapping of the antenna elements. As further discussed above, in aspects, the information associated with one or more UEs can information indicating a measurement or other data associated with signal quality for the one or more UEs.

For instance in one example scenario, the UE 332 may be initially located at a first position relative to the antenna array 320 at a first time. In such aspects, based on the information associated with the UE 332, the one or more antenna elements of the antenna array 320 may be configured to a first mapping to one or more logical ports, e.g., mapped to 32 ports, of the base station 310. Further, in such aspects, the UE 332 may be located at a second position relative to the antenna array 320 at a second time. In such aspects, based on the information associated with the UE 332, comprising signal quality information, the one or more antenna elements of the antenna array 320 may be re-configured to a second mapping to one or more logical ports, e.g., mapped to 4 ports, of the base station 310. The configuration of the one or more antenna elements of the antenna array 320 may be modified to reflect a mapping to one or more logical ports to provide an effective broadcast footprint that can more effectively provide communications to the UE 332, which may be moving or located at varied positions relative to the antenna array 320. In such aspects, at the first time, the antenna array 320 may be configured with a first mapping, while at a second time, the antenna array 320 may be configured with a second mapping.

In another example scenario, UE 332, may be located in a position that is occluded with respect to the antenna array 320. In such an aspect, the base station 310 may transmit a reference signal to the UE 332, requesting a measurement of signal quality. For example, the base station 310 may transmit a CSI-RS signal to the UE 332, for which the UE 332 may respond with a SINR measurement for the CSI-RS references signal. In such an aspect, based on the signal quality information from the UE 332, it may be desirable to modify the configuration of the one or more antenna elements of the antenna array 320 to support increased transmit power or beam steering. One or more antenna elements of the antenna array 320 may be identified for modification from a first mapping of the antenna elements to one or more logical ports to a second mapping of the antenna elements to the one or more logical ports to provide increased transmission performance to the variable location of the UE 332 in order more efficiently meet the UE's current needs. In one aspect of this example, the beamforming controller 112 of FIG. 1 may have determined that the UE's signal quality information indicated a diminished transmission performance, which facilitated identifying the one or more antenna elements for modifying the configuration of the antenna elements to a second mapping, e.g., mapping additional antenna elements to each logical port.

In yet another example scenario, the base station 310 may periodically send reference signal to the UE 332. The UE 332, in response to receiving a reference signal from the base station 310, may send a message to the base station 310 comprising signal quality information. The beamforming controller 112 of FIG. 1 may determine that based on the UE's signal quality information, that the antenna array 320 should be modified to employ a new configuration. The antenna array 320 may switch or modify all of the antenna elements from a first configuration, e.g., having a first number of sub-arrays mapped to a quantity of logical ports, to a second configuration, where the antenna elements are partitioned into a second number of sub-arrays mapped to a different quantity of logical ports. In some aspects, upon modifying the configuration of the antenna array 320, the base station 310 may transmit a message to the UE 332 comprising information associated with the updated configuration of the antenna elements of the antenna array 320.

In another example scenario, the configuration of the one or more antenna elements of the antenna array 320 may comprise calculating a beam 330 that is emitted by the antenna array 320. For example, updating the configuration of the antenna elements of the antenna array 320 may modify the mapping of the antenna elements from a first mapping to a second mapping while also modifying the parameters of the beam 330. The parameters of the beam 330 may be used to determine a beam weighting. The beam weighting may be based on a wideband beam amplitude scaling factor, a subband beam amplitude scaling factor, a beam phasing combining coefficient, or a combination thereof. The beam weighting, in addition to the mapping of the antenna elements to one or more logical ports, facilitate the steerability and efficiency of signals transmitted by the base station 310 and UE 332.

FIGS. 4A-4F depict different aspects of configurations of antenna elements of an antenna array with a first portion of antenna elements mapped to a first logical port and additional portions of antenna elements mapped to additional logical ports. It should be understood that while the aspects of FIGS. 4A-4F depict antenna arrays having eight columns of eight antenna elements each, other antenna array configurations are possible and contemplated by the disclosed herein. For instance, other configurations of an antenna array can include, but are not limited to, 16 columns of 4 antenna elements each, 4 columns of 16 antenna elements each, 32 columns of 2 antenna elements each, and so on. Additionally, configurations of an antenna array may include antenna elements arranged in formations other than a grid, such as a radial pattern, hexagonal tessellation, etc.

Figure 4A:
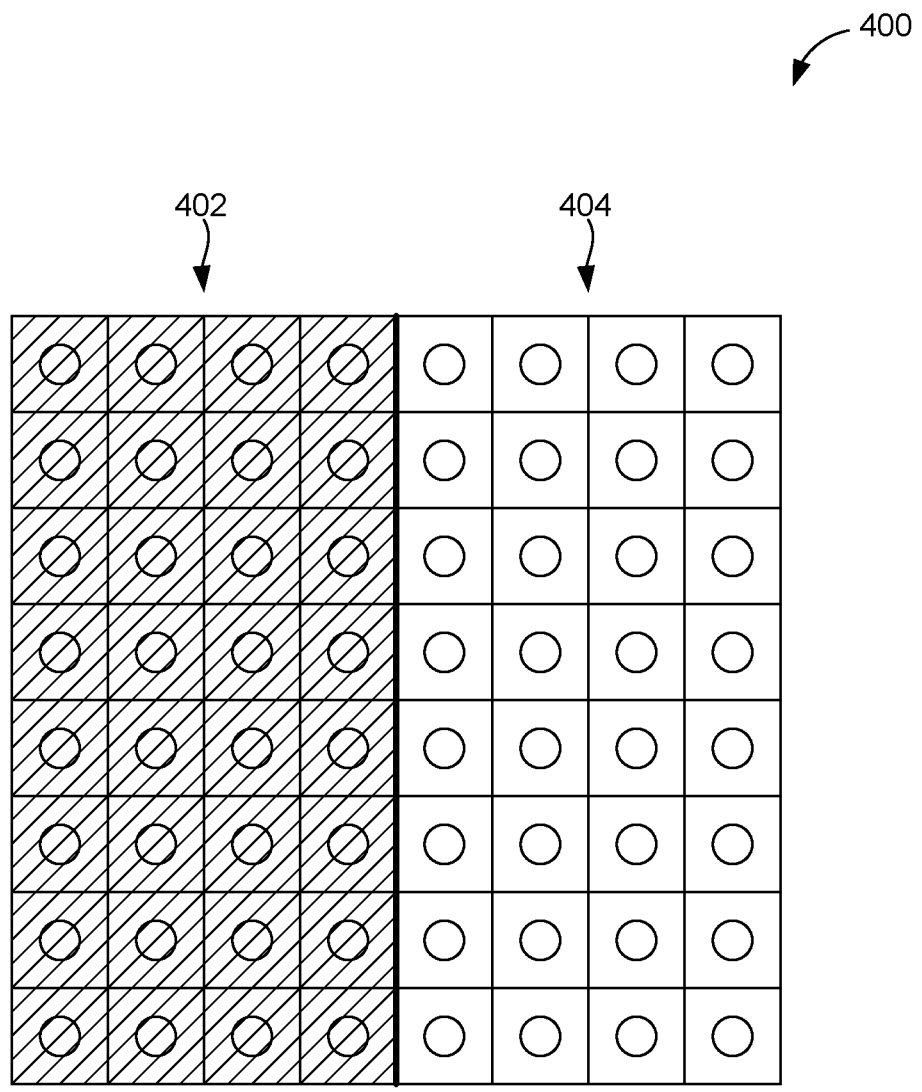
FIG. 4A-4E depict example configurations of various antenna elements of an antenna array utilizing a port mapping in accordance with aspects herein.

As can be seen in FIG. 4A, the antenna array 400 includes a grid of antenna elements, where the antenna array 400 comprises a first sub-array 402 of antenna elements and a second sub-array 404 of antenna elements. In aspects the first sub-array 402 may be mapped to a first set of one or more logical ports, while the second sub-array 404 may be mapped to a second set of one or more logical ports. For example, sub-array 402 may be mapped to 2 logical ports—one logical port for each antenna polarity—and sub-array 404 may be mapped to 2 other logical ports, to provide a total of 4 logical ports for the antenna array 400.

Figure 4B:
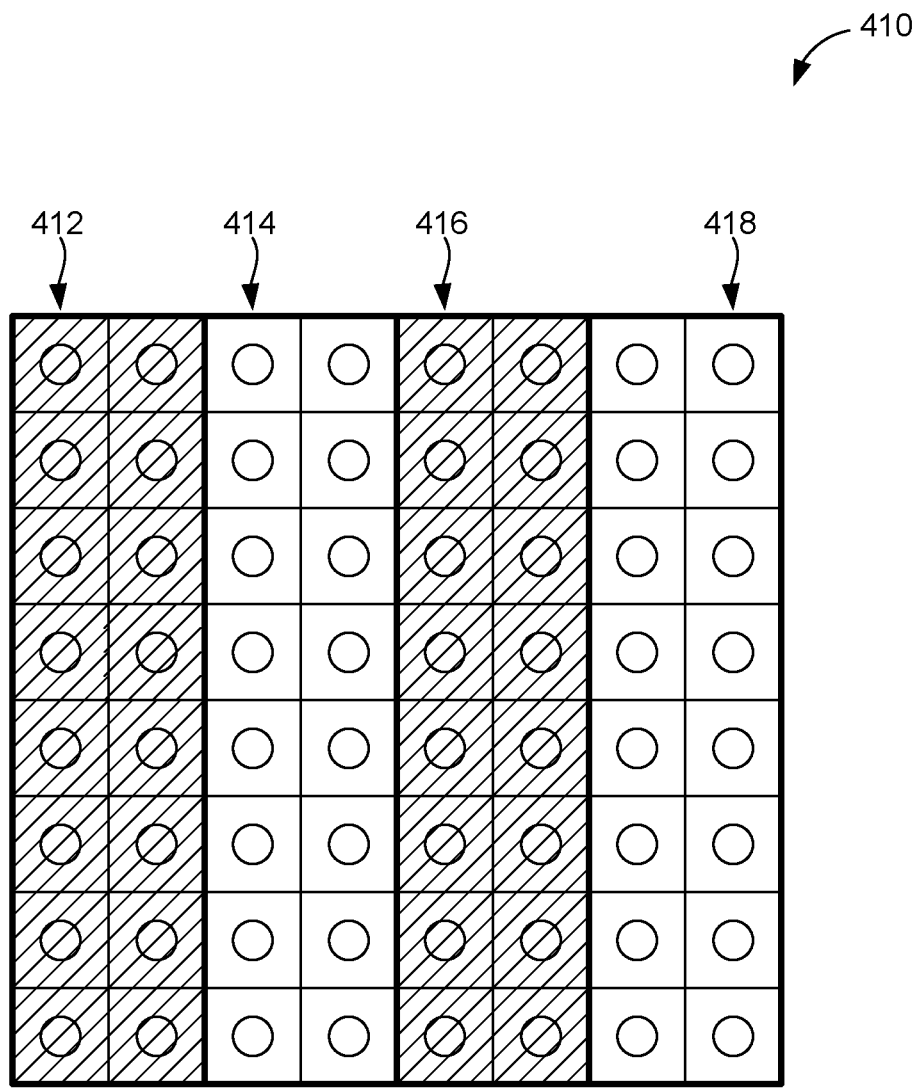

FIG. 4B represents another example configuration of an antenna array 410. As can be seen in FIG. 4B, the antenna array 410 includes four contiguous columns of sub-arrays 412, 414, 416, and 418, that are each configured to be mapped to a distinct set of one or more logical ports. For example, sub-arrays 412, 414, 416, and 418 may each be mapped to 2 logical ports giving a total of 8 logical ports. The configuration of FIG. 4B, compared to the configuration of FIG. 4A, provides an increased number of logical ports but a decreased number of physical antenna elements associated with each logical port.

Figure 4C:
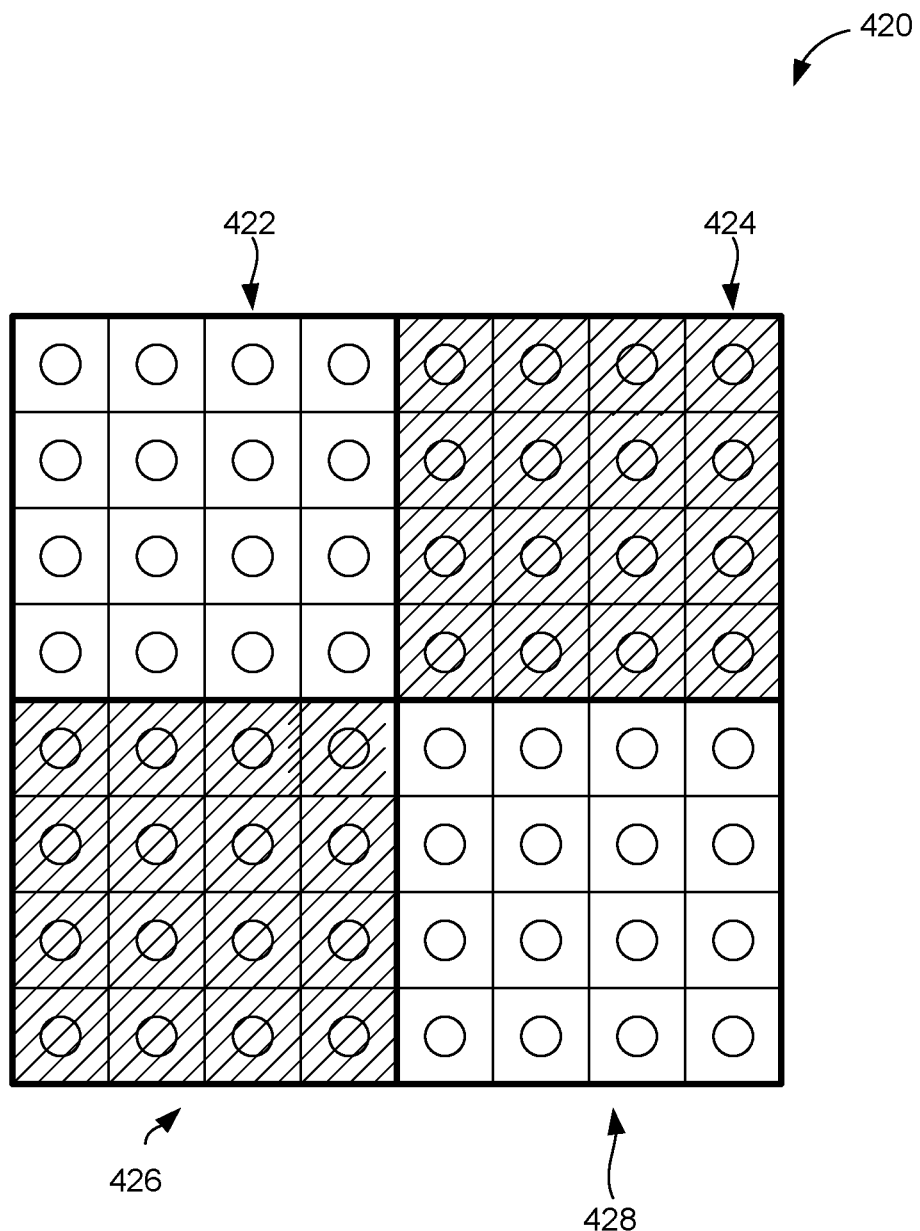

FIG. 4C represents another example configuration of an antenna array 420. As can be seen in FIG. 4C, the antenna array 420 includes four sub-arrays 422, 424, 426, and 428—arranged into multiple columns and rows-that are each configured to be mapped to a distinct set of one or more logical ports. For example, sub-arrays 422, 424, 426, and 428 may each be mapped to 2 logical ports giving a total of 8 logical ports. The configuration of FIG. 4C, compared to the configuration of FIG. 4A, provides an increased number of logical ports but a decreased number of physical antenna elements associated with each logical port.

Figure 4D:
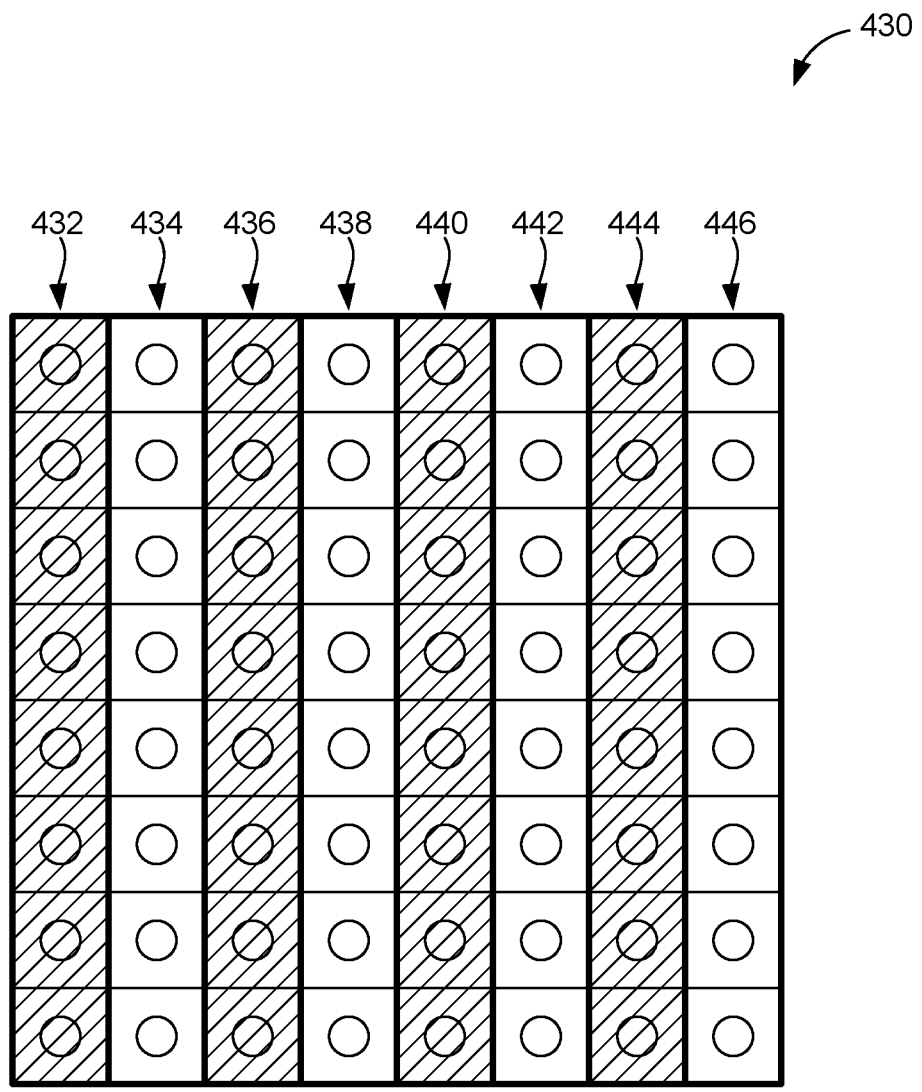

FIG. 4D represents another example configuration of an antenna array 430. As can be seen in FIG. 4D, the antenna array 430 includes eight contiguous columns of sub-arrays 432, 434, 436, 438, 440, 442, 444, and 446 that are each configured to be mapped to a distinct set of one or more logical ports. For example, sub-arrays 432, 434, 436, 438, 440, 442, 444, and 446 may each be mapped to 2 logical ports giving a total of 16 logical ports. The configuration of FIG. 4D, compared to the configurations of FIGS. 4A, 4B, and 4C, provides an increased number of logical ports but a decreased number of physical antenna elements associated with each logical port.

Figure 4E:
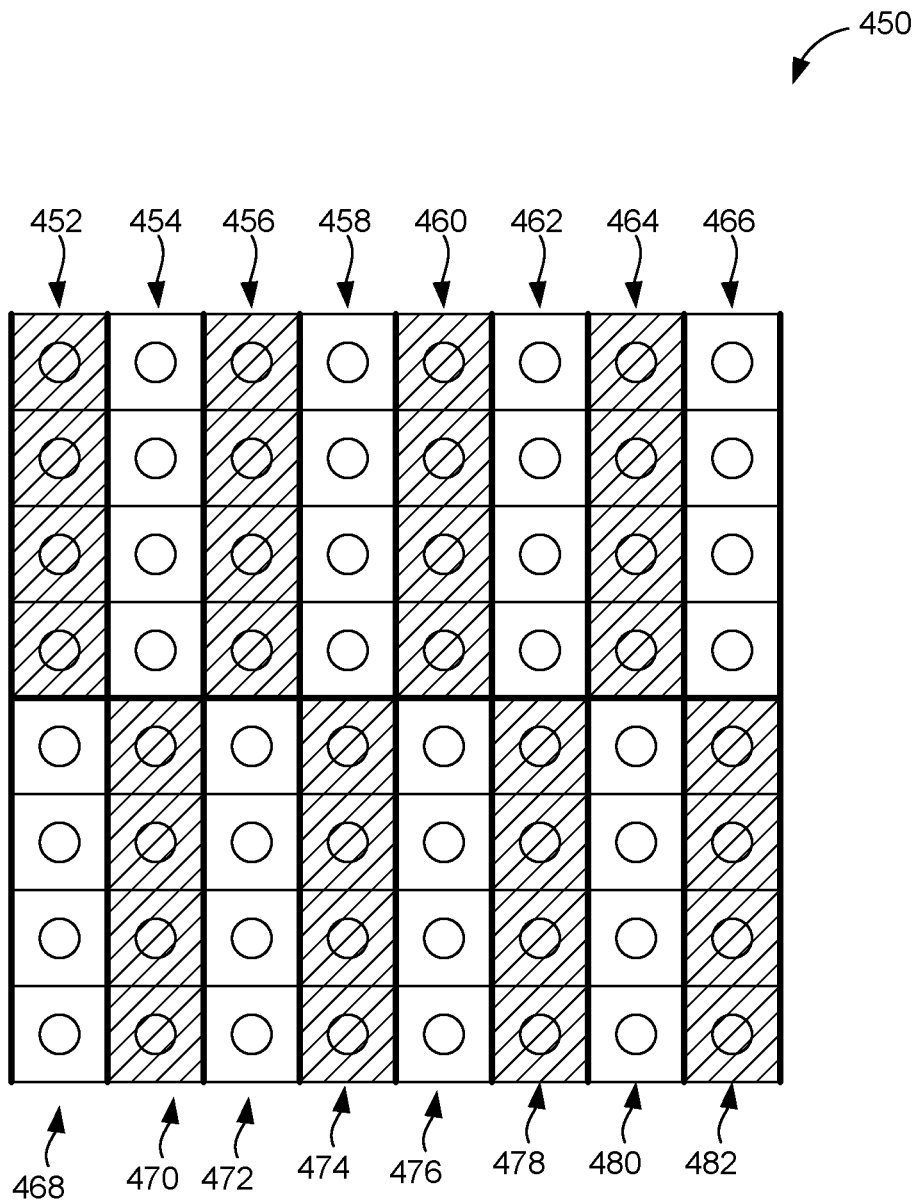

FIG. 4E represents another example configuration of an antenna array 450. As can be seen in FIG. 4E, the antenna array 450 includes sixteen sub-arrays 452, 454, 456, 458, 460, 462, 464, 466, 468, 470, 472, 474, 476, 478, 480, and 482 that are each configured to be mapped to a distinct set of one or more logical ports. For example, sub-arrays 452, 454, 456, 458, 460, 462, 464, 466, 468, 470, 472, 474, 476, 478, 480, and 482 may each be mapped to 2 logical ports giving a total of 32 logical ports. The configuration of FIG. 4E, compared to the configurations of FIGS. 4A, 4B, 4C, and 4D, provides an increased number of logical ports but a decreased number of physical antenna elements associated with each logical port.

It should be understood that FIGS. 4A-4E are just example configurations of various antenna elements utilizing differing arrangements of sub-arrays of antenna elements and that other configurations are also contemplated by the systems and methods disclosed herein. For example in one aspect, an antenna array can include sub-arrays arranges in any of a number of formations, such as various numbers of columns and/or rows. In another example, the antenna elements of a sub-array may be arranged in a formation such that all, none, and/or a portion of the antenna elements of the sub-array are positioned adjacent to each other.

In aspects, as discussed above, the systems and methods described herein may analyze information associated with one or more UEs to identify antenna elements within an antenna array for modification between a first mapping and a second mapping. Further, in aspects, the systems and methods described herein identify and modify antenna elements from one mapping to another mapping in order to effectively utilize the telecommunication resources based on UEs' signal quality information, capabilities, locations, and data needs. Accordingly, in various aspects, the systems and methods disclosed herein may modify a first mapping of an antenna array, such as the configuration depicted in the antenna array 206 of FIG. 2, to a second mapping, such as the configuration depicted in the antenna arrays 400, 410, 420, 430, and 450 of FIGS. 4A, 4B, 4C, 4D, and 4E, respectively.

In certain aspects as discussed above, the variable port mapping configurations for beamforming in antenna arrays based on signal quality information associated with a plurality of UEs can facilitate the effective allocation of telecommunications resources for the plurality of UEs. For instance, in certain aspects, the systems and methods disclosed herein may receive information associated with a UE and identify one or more antenna elements for modification from one configuration of antenna elements to another configuration of antenna elements, in order to benefit the data needs of the UE for a specified time period, and then thereafter, based on information associated with the UE, the systems disclosed herein may identify and modify one or more antenna elements to a different configuration to benefit the UE's needs at a different time period.

Figure 5:
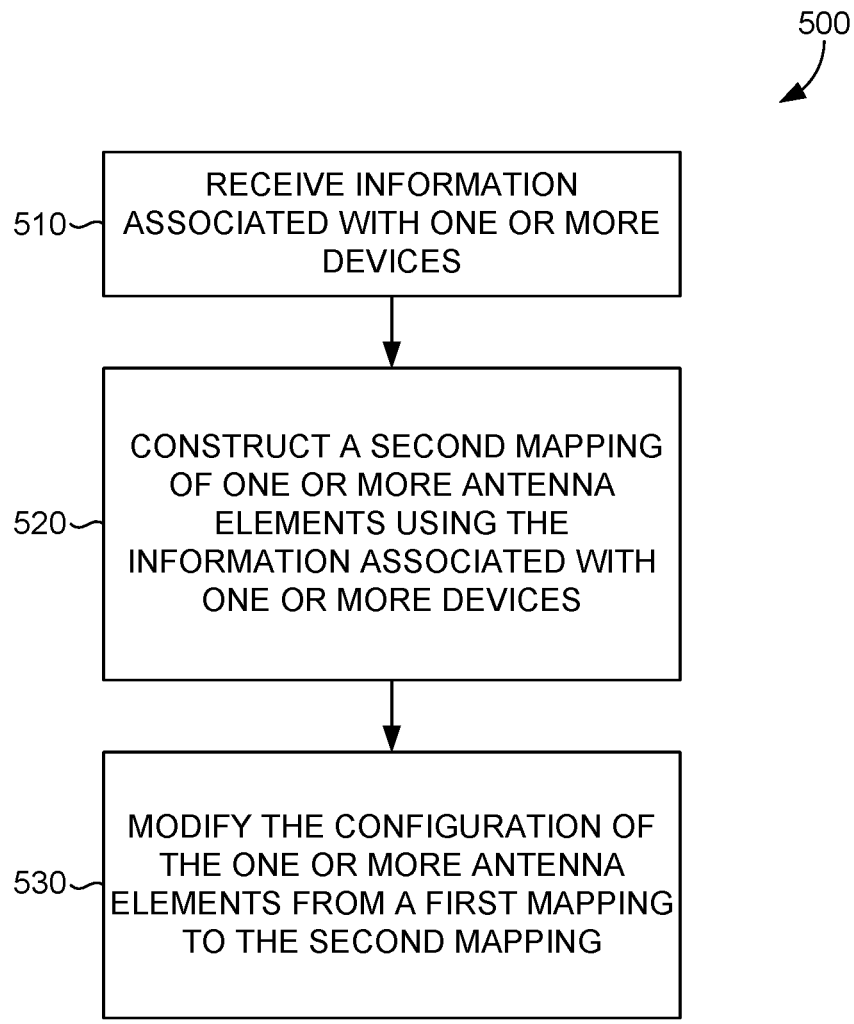
FIG. 5 depicts a flow diagram of an exemplary method for dynamically assigning a port mapping to one or more antenna elements of an antenna array, in accordance with aspects of the present disclosure.

FIG. 5 is a flow chart of a method 500 for variable port mapping configurations for beamforming in antenna arrays. In step 510 of the method 500, information associated with one or more devices, e.g., UEs, is received. In aspects, the information can be received by the receiver 116 of the beamforming controller 112 of the system 100 discussed above with reference to FIG. 1. In various aspects, the information associated with the one or more devices can signal quality information for each of the one or more devices. In the same or alternative aspects, the information associated with the one or more devices can include a total number of the one or more devices communicating with the antenna array, the communication capabilities of the one or more devices, an amount of data requested by the one or more devices, or a combination thereof.

Step 520 of the method 500, includes constructing a second mapping of one or more antenna elements. In aspects, the constructing of the second mapping in the step 520 can be based on the information associated with the one or more devices that was received in the step 510 of the method 500. In one aspect, the step 520 can be performed via the identifier 118 of the beamforming controller 112 of the system 100 discussed above with reference to FIG. 1. In certain aspects, the step 520 can result in identifying one or more antenna elements for modification between a first mapping and a second mapping in order to meet the communication performance needs of one or more UEs based on their signal quality information.

Step 530 of the method 500 includes modifying the configuration of the one or more antenna elements from a first mapping to a second mapping. In aspects, the step 530 is performed after the second mapping is constructed in the step 520. In certain aspects, the switching controller 120 of the beamforming controller 112 of the system 100 described above with reference to FIG. 1 can be utilized to perform the step 530. In certain aspects, as discussed above, modifying the configurations can include modifying a set of one or more antenna elements from a first mapping of sub-arrays of the antenna elements to a second mapping of sub-arrays of the antenna elements. In various aspects as also discussed above, modifying the configurations may include instructing at least one power amplifier coupled to the antenna array or to one or more antenna elements to adjust controls of one or more antenna elements for beamforming in accordance with the current configuration of the antenna elements. In various aspects, modifying the configurations of antenna elements may configure the antenna elements as depicted in FIGS. 4A-4E, or any other configuration contemplated herein.

Figure 6:
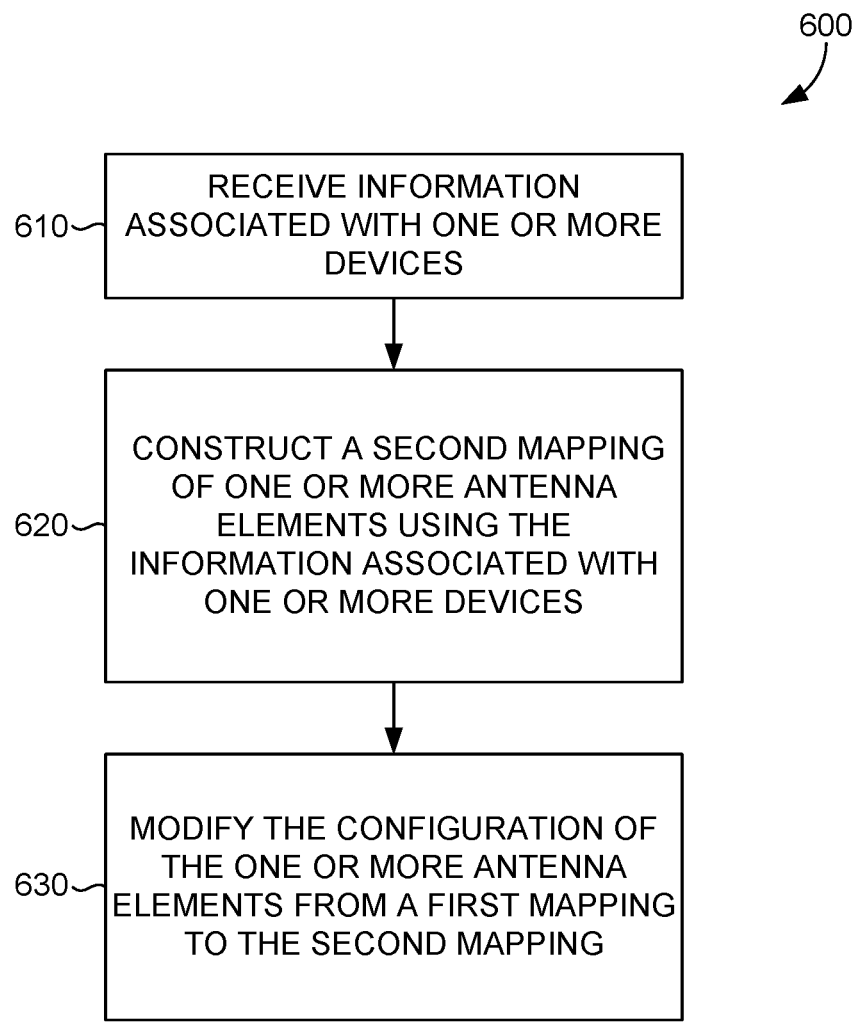
FIG. 6 depicts a flow diagram of an another exemplary method for dynamically assigning a port mapping to one or more antenna elements of an antenna array, in accordance with aspects of the present disclosure.

FIG. 6 is a flow chart of a method 600 for variable port mapping configurations for beamforming in antenna arrays. In step 610 of the method 600, information associated with one or more devices, e.g., UEs, is received. In aspects, the information can be received by the receiver 116 of the beamforming controller 112 of the system 100 discussed above with reference to FIG. 1. In various aspects, the information associated with the one or more devices can signal quality information for each of the one or more devices. In the same or alternative aspects, the information associated with the one or more devices can include a total number of the one or more devices communicating with the antenna array, the communication capabilities of the one or more devices, an amount of data requested by the one or more devices, or a combination thereof Step 620 of the method 600, includes constructing a second mapping of one or more antenna elements. In aspects, the constructing of the second mapping in the step 620 can be based on the information associated with the one or more devices that was received in the step 610 of the method 600. In one aspect, the step 620 can be performed via the identifier 118 of the beamforming controller 112 of the system 100 discussed above with reference to FIG. 1. In certain aspects, the step 620 can result in identifying one or more antenna elements for modification between a first mapping and a second mapping in order to meet the communication performance needs of one or more UEs based on their signal quality information.

Step 630 of the method 600 includes modifying the configuration of the one or more antenna elements from a first mapping to a second mapping. In aspects, the step 630 is performed after the second mapping is constructed in the step 620. In certain aspects, the switching controller 120 of the beamforming controller 112 of the system 100 described above with reference to FIG. 1 can be utilized to perform the step 630. In certain aspects, as discussed above, modifying the configurations associated with distinct mappings can include modifying a set of one or more antenna elements from a first mapping of sub-arrays of the antenna elements to a second mapping of sub-arrays of the antenna elements. In various aspects as also discussed above, modifying the configurations may include instructing at least one power amplifier coupled to the antenna array or to one or more antenna elements to adjust controls of one or more antenna elements for beamforming in accordance with the current configuration of the antenna elements. In various aspects, modifying the configurations of antenna elements may arrange the antenna elements as depicted in FIGS. 4A-4E, or any other configuration contemplated herein.

Figure 7:
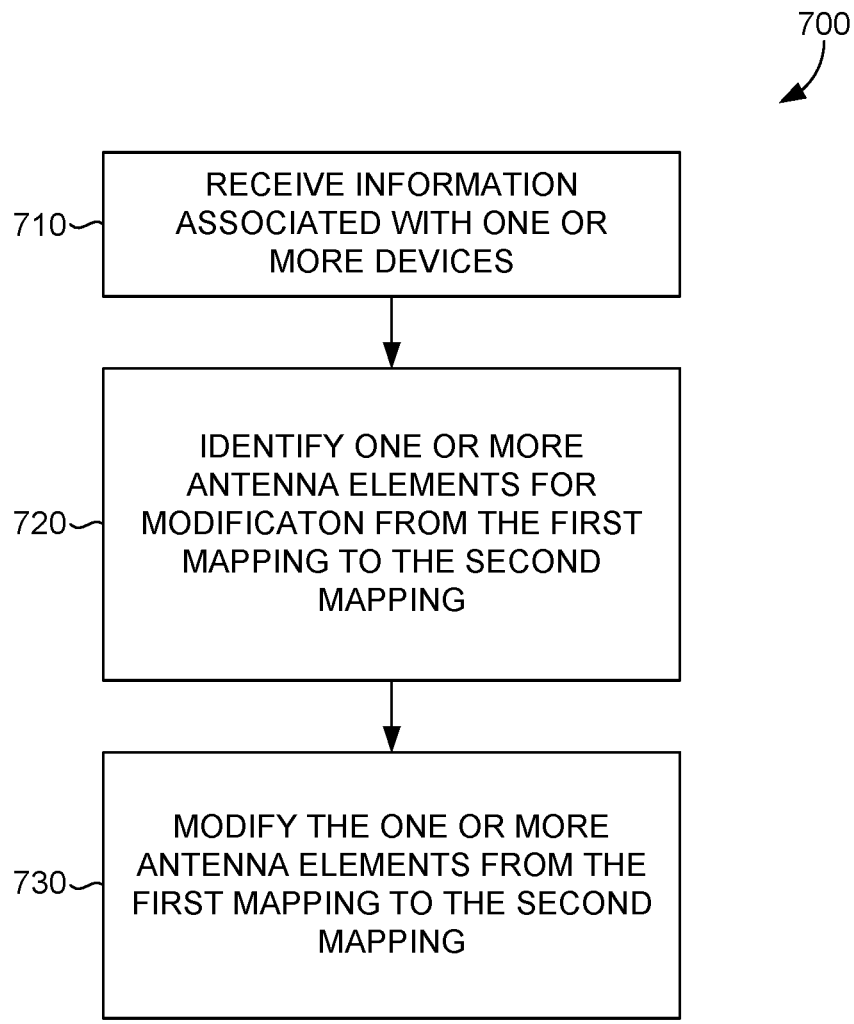
FIG. 7 depicts a flow diagram of another exemplary method for dynamically assigning a port mapping to one or more antenna elements of an antenna array, in accordance with aspects of the present disclosure.

FIG. 7 is a flow chart of a method 700 for variable port mapping configurations for beamforming in antenna arrays. In aspects, at a first time, the antenna array can include a plurality of antenna elements that utilizes a first mapping of the plurality of antenna elements.

In step 710 of the method 700, information associated with one or more devices, e.g., UEs, is received. In aspects, the information can be received by the receiver 216 of the beamforming controller 112 of the system 100 discussed above with reference to FIG. 1. In various aspects, the information associated with the one or more devices can include signal quality information for each of the one or more devices. In the same or alternative aspects, the information associated with the one or more devices can include a total number of the one or more devices communicating with the antenna array, the communication capabilities of the one or more devices, an amount of data requested by the one or more devices, or a combination thereof.

Step 720 of the method 700, includes identifying one or more antenna elements of the plurality of antenna elements for modification from the first mapping of the antenna elements to a second mapping of the antenna elements. In aspects, the identifying of the step 720 can be based on the information associated with the one or more devices that was received in the step 710 of the method 700. In one aspect, the step 720 can be performed via the identifier 118 of the beamforming controller 112 of the system 100 discussed above with reference to FIG. 1.

Step 730 of the method 700 includes modifying the one or more antenna elements of the plurality of antenna elements from the first mapping of antenna elements to the second mapping of antenna elements, at a second time. In aspects, the step 730 is performed after the one or more antenna elements have been identified for modifying mappings of antenna elements in the step 720. In certain aspects, the switching controller 120 of the beamforming controller 112 of the system 100 described above with reference to FIG. 1 can be utilized to perform the step 730. In various aspects as also discussed above, modifying the one or more antenna elements between mappings may include instructing at least one power amplifier coupled to the antenna array or to one or more antenna elements to adjust controls of one or more antenna elements for beamforming in accordance with the current configuration of the antenna elements. In various aspects, modifying the mappings of antenna elements may result in a configuration of antenna elements as depicted in FIGS. 4A-4E, or any other configuration contemplated herein.

Figure 8:
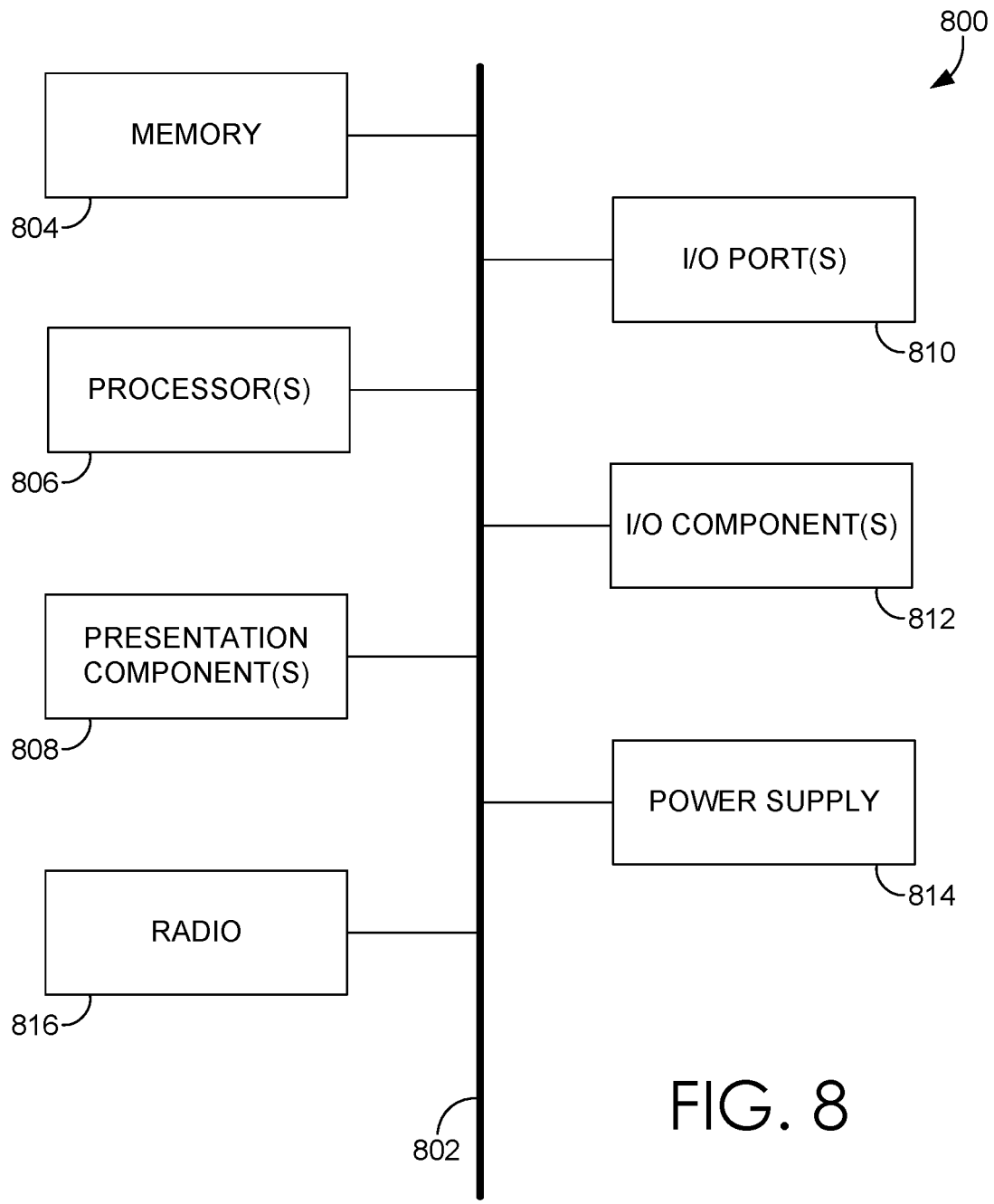
FIG. 8 depicts a diagram of an exemplary computing environment suitable for use in implementations of the present disclosure.

Referring now to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, power supply 814 and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component, such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 804 includes computer-storage media in the form of volatile and/or nonvolatile memory. Memory 804 may be removable, non-removable, or a combination thereof. Exemplary memory includes solid-state memory, hard drives, optical-disc drives, etc. Computing device 800 includes one or more processors 806 that read data from various entities, such as bus 802, memory 804, or I/O components 812. One or more presentation components 808 presents data indications to a person or other device. Exemplary one or more presentation components 808 include a display device, speaker, printing component, vibrating component, etc. I/O ports 810 allow computing device 800 to be logically coupled to other devices, including I/O components 812, some of which may be built in computing device 800. Illustrative I/O components 812 include a microphone, joystick, game pad, satellite dish, scanner, printer, wireless device, etc.

Radio 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method for configuring one or more antenna elements of an antenna array, the method comprising:
   receiving information associated with one or more devices, the information comprising signal quality information for each of the one or more devices;
   based on the one or more antenna elements being configured in a first mapping, constructing a second mapping of the one or more antenna elements using the information associated with the one or more devices; and
   modifying a configuration of the one or more antenna elements from the first mapping to the second mapping based on the signal quality information for each of the one or more devices.

2. The method of claim 1, further comprising transmitting, to the one or more devices, a message comprising information associated with the second mapping.

3. The method of claim 1, wherein receiving the information associated with the one or more devices is in response to the one or more devices receiving a reference signal transmitted by the one or more antenna elements.

4. The method of claim 1, wherein the first mapping indicates a set of logical ports, each logical port of the set of logical ports associated with a portion of the one or more antenna elements.

5. The method of claim 1, wherein modifying the configuration of the one or more antenna elements from the first mapping to the second mapping further comprises partitioning the one or more antenna elements of the antenna array into a set of sub-arrays.

6. The method of claim 5 further comprising configuring the first mapping, wherein the configuring further comprises mapping one or more logical ports to a sub-array of the set of sub-arrays.

7. The method of claim 1, wherein the signal quality information comprises at least one of SINR, RSRP, or RSRQ measurements.

8. The method of claim 1, wherein the one or more antenna elements of the antenna array utilize a wireless communication protocol to transmit messages to the one or more devices.

9. The method of claim 1, further comprising generating one or more beams using the one or more antenna elements based on the first mapping or the second mapping, each beam of the one or more beams being weighted by a calculated beam weight.

10. The method of claim 1, further comprising transmitting a message to the one or more devices based on modifying the configuration of the one or more antenna elements from the first mapping to the second mapping, the message comprising information indicative of the second mapping.

11. One or more non-transitory computer-readable media having computer-executable instructions embodied thereon that, when executed, perform a method for configuring one or more antenna elements of an antenna array, the method comprising:
   receiving information associated with one or more devices, the information comprising signal quality information for each of the one or more devices;
   based on the one or more antenna elements being configured in a first mapping, constructing a second mapping of the one or more antenna elements using the information associated with the one or more devices; and
   modifying a configuration of the one or more antenna elements from the first mapping to the second mapping based on the signal quality information for each of the one or more devices.

12. The non-transitory media of claim 11, further comprising transmitting a message to the one or more devices based on modifying the configuration of the one or more antenna elements from the first mapping to the second mapping, the message comprising information indicative of the second mapping.

13. The non-transitory media of claim 11, wherein receiving the information associated with the one or more devices is in response to the one or more devices receiving a reference signal transmitted by the one or more antenna elements.

14. The non-transitory media of claim 11, wherein modifying the configuration of the one or more antenna elements from the first mapping to the second mapping further comprises partitioning the one or more antenna elements of the antenna array into a set of sub-arrays, wherein the first mapping comprises mapping one or more logical ports to a sub-array of the set of sub-arrays.

15. A system for configuring an antenna array, the system comprising:
   the antenna array comprising a plurality of antenna elements, wherein, at a first time, the plurality of antenna elements configured according to a first mapping; and
   a processor configured to execute operations comprising:
      receiving information associated with one or more devices, the information comprising signal quality information for each of the one or more devices;
      identifying, based on the information associated with the one or more devices, one or more antenna elements of the plurality of antenna elements for modification between the first mapping of the plurality of antenna elements and a second mapping of the plurality of antenna elements; and
      modifying, at a second time, the one or more antenna elements of the plurality of antenna elements from the first mapping to the second mapping based on the signal quality information for each of the one or more devices.

16. The system of claim 15, wherein the plurality of antenna elements are arranged in a grid formation within the antenna array, the grid formation comprising a plurality of columns of the plurality of antenna elements and a plurality of rows of the plurality of antenna elements.

17. The system of claim 15, wherein identifying the one or more antenna elements of the antenna array for modification further comprises:
   determining a set of logical ports, wherein a quantity of logical ports in the set of logical ports is based on the information associated with the one or more devices;
   partitioning the plurality of antenna elements into a plurality of antenna sub-arrays, the plurality of antenna sub-arrays partitioned in a horizontal and/or vertical arrangement of the plurality of antenna elements and based on the quantity of logical ports in the set of logical ports; and
   associating each logical port of the set of logical ports to a respective antenna sub-array of the plurality of antenna sub-arrays.

18. The system of claim 15, wherein modifying the one or more antenna elements of the plurality of antenna elements from the first mapping to the second mapping further comprises transmitting a message, using the antenna array, to the one or more devices, the message comprising an indication that the one or more antenna elements of the plurality of antenna elements have been modified from the first mapping to the second mapping.

19. The system of claim 15, wherein the operations further comprise:
- transmitting to the one or more devices, using the one or more antenna elements, a channel state information reference signal; and
- causing the one or more devices to generate the signal quality information.

20. The system of claim 15, wherein the operations further comprise determining one or more beams associated with the one or more antenna elements based on the second mapping, each beam of the one or more beams weighted based on one of a beam power value, a wideband beam amplitude scaling factor, a subband beam amplitude scaling factor, a beam phase, or a combination thereof.

* * * * *